United States Patent [19]

Scull

[11] 4,250,913
[45] Feb. 17, 1981

[54] PILOT MECHANISM FOR PRESSURE REGULATING VALVE

[75] Inventor: William L. Scull, Rockaway Township, Morris County, N.J.

[73] Assignee: Leslie Co., Parsippany, N.J.

[21] Appl. No.: 36,664

[22] Filed: May 7, 1979

[51] Int. Cl.³ .......................................... F16K 31/365
[52] U.S. Cl. .................................. 137/488; 137/116.5
[58] Field of Search ...................... 137/488, 492, 492.5, 137/489.5, 116.5, 116.3, 85

[56] References Cited

U.S. PATENT DOCUMENTS

| 2,277,162 | 3/1942 | Soderberg . | |
| 2,624,980 | 1/1953 | Hughes | 137/492.5 |
| 2,761,464 | 9/1956 | Faust | 137/116.5 |
| 2,879,783 | 3/1959 | Taplin | 137/116.5 |
| 3,022,800 | 2/1962 | Boonshaft | 137/85 X |

*Primary Examiner*—Alan Cohan
*Attorney, Agent, or Firm*—Lerner, David, Littenberg & Samuel

[57] ABSTRACT

A pilot mechanism for a pressure regulating valve having a relatively high pressure inlet, a relatively low pressure outlet and main valve pressure responsive means for operating the main valve to control the pressure of the fluid downstream of the main valve. The pilot mechanism comprises pilot valve means for supplying a loading fluid to one side of the main valve pressure responsive means. A normally closed bleed leakage path is provided in communication with the loading fluid supplied to the main valve pressure responsive means for directing loading fluid away from the main valve pressure responsive means when the bleed path is opened. Second pressure responsive means are provided responsive to the pressure of the fluid to be controlled for controlling the position of the pilot valve means to in turn control the flow of loading fluid supplied to the main valve pressure responsive means. The second pressure responsive means includes bleed control means responsive to a predetermined increase in the pressure of the fluid to be controlled for opening the bleed leakage path to rapidly reduce the pressure of the loading fluid operating on the main valve pressure responsive means. In this way, a quicker, more rapid response to changes in the pressure of the fluid to be controlled may be achieved.

26 Claims, 4 Drawing Figures

PILOT MECHANISM FOR PRESSURE REGULATING VALVE

BACKGROUND OF THE INVENTION

The present invention relates to pressure regulating valves and more particularly to pilot operated pressure regulating valves which include a pilot mechanism for supplying a loading fluid to one side of a main valve pressure responsive element which controls the flow rate through the valve.

Prior art pilot operated pressure regulating or reducing valves generally utilize a pilot mechanism which senses the pressure of the fluid to be controlled (normally the pressure downstream of the main valve) and varies the pressure on the main valve pressure responsive element to open and close the main valve to control the flow rate through the valve, and thus the pressure drop across the valve to thereby control pressure of the fluid downstream of the valve.

In typical prior art pilot operated pressure reducing valves, the pressure sensing mechanism of the pilot mechanism comprises a diaphragm or other pressure responsive element which has the downstream pressure applied to one side and an adjustable force applying member applied to the other side, such as for example an adjusting spring mechanism. Changes in downstream pressure cause motion of the pilot pressure responsive element which is then transmitted to a small pilot valve member which opens and closes to vary the supply of a relatively high loading pressure to the main valve pressure responsive element. More particularly, the high pressure loading fluid may for example be taken from the upstream side of the main valve assembly, and the outlet of the pilot valve may be connected to the area above the main valve pressure responsive element. Thus, as the downstream pressure drops below the set point (adjusted by the adjusting spring) the pilot pressure responsive element will move in a direction to open the pilot valve to thus increase the loading pressure to the main valve diaphragm which in turn opens the main valve to increase the flow therethrough and thus the outlet pressure.

For an increase in the outlet pressure of the main valve, an opposite action occurs to decrease the main valve pressure responsive element loading pressure to in turn reduce the main valve opening. More particularly, an increase in the downstream pressure causes the pilot valve sensing diaphragm to move in a direction to close the pilot valve. A small fixed bleed orifice or other bleed leakage mechanism is connected between the outlet side of the pilot valve and the low pressure downstream side of the main valve in order to remove loading pressure from the main valve diaphragm. This small fixed bleed orifice is always open, even during normal steady operation to provide a continuous bleed leakage. Thus, during normal operation, the pilot valve is usually unseated from its valve seat so that loading pressure is always being supplied to the area above the main valve diaphragm, the rate of flow of loading fluid supplied substantially corresponding to the flow rate through the bleed orifice.

One problem encountered with prior art pilot operated pressure regulating valves has been the gain or sensitivity of the pilot mechanism which is affected by the system pressure drop (i.e., the inlet pressure minus the outlet pressure). For high pressure drops, very small motions of the pilot valve cause large changes in the diaphragm or loading pressure thus providing the high gain. At low pressure drops on the other hand, the opposite occurs. If the valve is designed with some minimum acceptable gain for low pressure drop conditions, it tends to be unstable at high pressure drops. That is, when designed to provide an acceptable gain for low pressure drop conditions, the mechanism tends to overcompensate or overshoot the desired limit at high pressure drops and thus unbalance the outlet pressure in the opposite direction. Such action could continue for a considerable period of time before the regulator is stabilized since the pressure impulse caused by the repositioning of the main valve is not transmitted immediately to the pilot diaphragm.

One prior art arrangement aimed at overcoming this "hunting" effect is U.S. Pat. No. 2,277,162 to Soderberg which utilizes double diaphragms or pressure responsive elements for pilot operated regulators. The double diaphragms are operatively connected together with the pressure from the downstream side of the main valve (the fluid to be controlled) introduced therebetween. A relatively high pressure loading fluid is subjected to the lower side of the lowermost diaphragm (against the downstream pressure acting on the other side). On the upper side of the upper diaphragm, a spring acts against the force of the downstream pressure acting on the upper diaphragm. The arrangement is such that the effective pressure area of the lower diaphragm on which the downstream pressure acts is progressively decreases as it moves upwardly (i.e., as the pilot valve closes further in response to increases in downstream pressure), whereas the effective pressure area is progressively increased when the diaphragm moves downwardly (i.e., as the pilot valve opens further in response to decreases in downstream pressure). This change in effective pressure area serves to counteract the downstream pressure changes to prevent overregulation or "hunting" so that a balanced condition will be achieved more quickly, and movement of the main regulating valve reduced.

However, with the Soderberg arrangement, as with the other prior art arrangements, a continuous leakage of the loading pressure is provided to release excess pressure or fluid introduced onto the main pressure responsive elements. Thus, when the downstream pressure increases beyond the preset limit the arrangement is such that the pilot valve supplying the loading pressure to the main valve diaphragm tends to close with the excess loading fluid being removed from the main pressure responsive element only through the bleed leakage path. In the Soderberg reference, this leakage path is arranged between the main valve pressure responsive piston and the side of the cylinder within which it moves. As can be appreciated, for large changes in downstream pressure, it may take a relatively considerable amount of time for the excess loading pressure to be directed away from the main pressure responsive element, thus slowing the response time for the valve. On the other hand, if a large continuous bleed opening were included to provide for a quicker response for the main valve, small changes in pressure drop and fluid turbulence can lead to instability or "chatter" of the main valve.

SUMMARY OF THE INVENTION

These and other disadvantages of the prior art are overcome with the present invention which provides a pilot mechanism for a pressure regulating valves having a relatively high pressure inlet, a relatively low pressure outlet and main valve pressure responsive means for operating the main valve for controlling the flow of fluid through the valve. In accordance with the present invention, the pilot mechanism comprises pilot valve means for supplying a loading fluid to one side of the main pressure responsive means. A normally closed bleed leakage path is provided for communication with the loading fluid supplied to the main valve pressure responsive means for directing loading fluid away from the main valve pressure responsive means when the leakage path is opened. Second pressure responsive means responsive to the pressure of the fluid to be controlled are provided for controlling the position of the pilot valve means to in turn control the flow of loading fluid supplied to the main valve pressure responsive means. The second pressure responsive means includes bleed control means responsive to a predetermined increase in the pressure of the fluid to be controlled for opening the bleed leakage path to rapidly reduce the pressure of the loading fluid operating on the one side of the main valve pressure responsive means. Such an arrangement effects a quick bleeding of the loading pressure on the main valve pressure responsive means to provide for a quick response to changes in downstream pressure, as well as providing greater and faster correction capabilities for the pilot operated regulating valve, thereby resulting in less migration of the main valve plug.

In the preferred embodiment, a second bleed leakage path is provided in communication with the loading fluid supplied to the main valve pressure responsive means for also directing loading fluid thereawayfrom. This second bleed leakage path is normally opened and has a higher resistance to fluid flow than the normally closed bleed leakage path so that when the normally closed bleed leakage path is opened, a greater amount of loading fluid is directed therethrough than through the second bleed leakage path. The provision of this normally opened bleed leakage path serves to ensure that there are no deadbands or ranges in which changes in downstream pressure might otherwise not effect changes in loading fluid supplied to the main valve pressure responsive means. Further, because the second normally opened bleed path has a relatively high fluid resistance, small changes in pressure drop and fluid turbulence will not greatly affect the positioning of the main valve. This results in greater stability than the prior art arrangements, with less migration or movement of the main valve plug.

Further in accordance with the preferred embodiment, the second pressure responsive means comprises a pair of spaced, pressure responsive elements connected together and defining a chamber therebetween in communication with the fluid to be controlled. The pair of pressure responsive elements have different effective areas and one of the pressure responsive elements is subject, on the side opposite from the chamber, to the loading fluid. In this way, the gain of the pilot mechanism can be determined by design and be a constant, independent of the system pressure drop.

Further in accordance with the preferred embodiment, the normally closed bleed leakage path comprises a fluid passageway extending between the area in communication with the main valve pressure responsive means and the fluid chamber defined between the pair of pressure responsive elements. This bleed passageway is normally closed by a portion of the valve stem of the pilot valve when the pressure responsive elements and the pilot valve stem are in contact with one another. When the pressure of the fluid being controlled increases beyond a predetermined limit, the pair of pressure responsive elements separate from the pilot valve stem as the pilot valve closes so that loading pressure is directed through the passageway into the chamber between the pressure responsive elements to provide for a rapid decrease in loading pressure on the main valve pressure responsive means.

These and further features and characteristics of the present invention will be apparent from the following detailed description in which reference is made to the enclosed drawings which illustrate preferred embodiments of the present invention.

DETAILED DESCRIPTION OF THE PREFERRED EMBODIMENT

Figure 1:
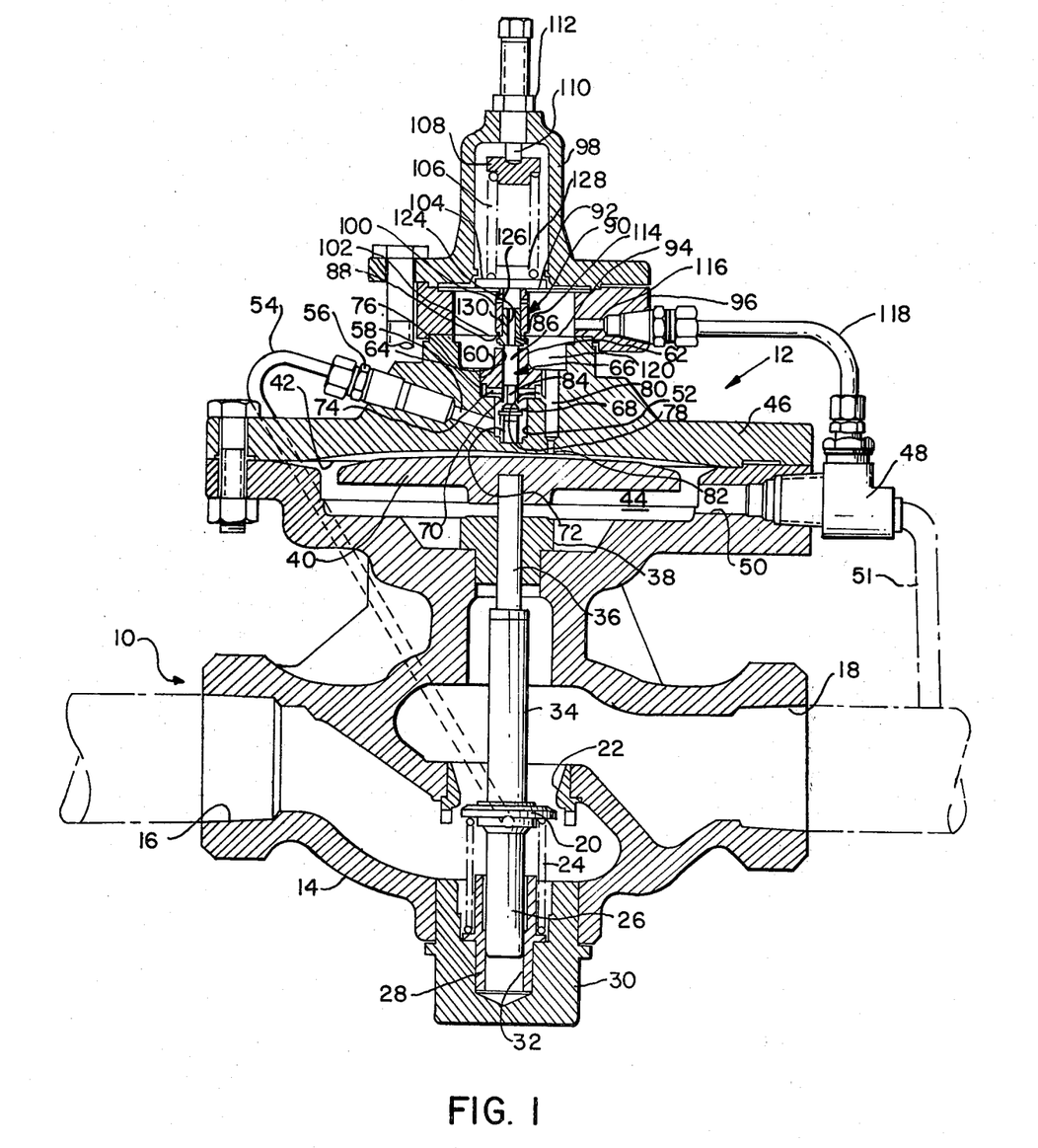
FIG. 1 is a sectional elevational view of the pressure regulating valve and pilot mechanism in accordance with the present invention.

Referring now to the drawings in which like reference characters represent like elements, there is shown in FIG. 1 a main pressure regulating valve 10 and pilot mechanism 12 therefor in accordance with the present invention. The main regulating valve 10 comprises a valve casing 14 having an inlet 16 which is adapted to be connected to a fluid supply line for supplying fluid at a relatively high pressure, and an outlet 18 which is adapted to be connected to a fluid outlet to which the fluid exiting from the valve 10 is adapted to be delivered at a relatively low pressure. The function of the valve 10 is to reduce the pressure of the fluid from the relatively high inlet valve to the relatively low desired outlet value. This flow of fluid through the regulator 10 and reduction in pressure is controlled by a main valve plug 20 which cooperates with a valve seat 22 threaded in a partition between the inlet and outlet ends 16, 18 of the casing 14. A compression spring 24 urges the main valve plug 20 towards its seat 22, and is coiled about a guide rod 26 on the main valve plug 20 and around a hollow sleeve 28 projecting upwardly from a threaded fitting 30 secured to the bottom of the casing 14. The valve guide rod 26 is slidable in the bore 32 of the sleeve 28.

Extending upwardly from the main valve plug 20 is a valve stem 34 which has a reduced upper end 36 which is slidably mounted in a threaded sleeve 38 secured in a recess at the upper end of the casing 14. The reduced upper end 36 above the threaded sleeve 38 is engaged with a pressure responsive element, such as for example a disc shaped reinforcing member or plate 40 which functions as a stiffening member for a pressure responsive diaphragm 42 held in a diaphragm chamber 44 between the main valve casing 14 and a cover member 46. The lower side of the main valve diaphragm 42 is subjected to the relatively low downstream pressure of the fluid to be controlled, the fluid being introduced via a coupling 48 secured to the casing 14 and communicating through a passageway 50 with the diaphragm chamber 44 and through a suitable fluid conduit 51 with the fluid downstream of the main valve 10. The upper surface of the main valve diaphragm 42 is subjected to the relatively high pressure of a loading fluid supplied via the pilot valve mechanism 12 above the diaphragm 42. The differential pressure between this relatively high loading pressure and the relatively low outlet pressure of the fluid downstream of the main valve 10 acts on the main valve diaphragm 42 to control the position of the main valve plug 20 relative to its valve seat 22. This positioning of the main valve plug 20 in turn controls the flow of fluid from the inlet end 16 to the outlet end 18. The force exerted on the diaphragm 42 for effecting movement of the main valve plug 20 is biased towards the flow preventing position by means of the coiled spring 24.

During normal operation, the main valve plug 20 remains open to a sufficient degree to provide the desired outlet pressure for the fluid downstream of the valve 10. As is well known in the art, a greater extent of opening of the main valve plug 20 relative to its valve seat 22 results in a relatively higher outlet pressure, as the pressure drop between the inlet and outlet ends 16, 18 is less than when the main valve plug 20 is closed to a greater extent, in which case there is a larger pressure drop between the inlet and outlet ends 16, 18 and consequently a lower outlet pressure.

Proper control of the outlet pressure of the fluid exiting from the main valve 10 is accomplished by means of the pilot mechanism 12 which supplies the relatively high loading pressure to the upper surface of the main valve diaphragm 42. The higher the loading pressure supplied, the greater the pressure differential across the main valve diaphragm 42 and thus the greater the downward force to move the main valve plug 20 to a more open position (it should be noted that the downward force on the main valve diaphragm 42 is balanced by the force of the spring 24). On the other hand, reduction in the loading pressure on the upper surface of the main valve diaphragm 42 causes the main valve plug 20 to move towards the closed position.

The pilot mechanism 12 is provided in the upper casing cover member 46 and includes a pilot valve chamber 52, to which a loading fluid supply conduit 54 is coupled by means of coupling device 56. In the preferred embodiment, this supply conduit 54 communicates with the upstream side of the main valve 10 at or near the location of the main valve spring plug 20. The pilot valve chamber 52 comprises a first substantially cylindrical bore in the casing cover mechanism 46 communicating through a radial duct 58 with the fluid supply conduit 54. A second bore 60 of a larger diameter than the first bore 52 is provided above the first bore 52 and is adapted to receive a threaded seating member 62 which includes a central bore 64 extending therethrough for receiving the valve stem 66 of a pilot valve plug member 68. A valve seat 70 for the pilot valve plug member 68 is provided at the lower end of the seating member 62. As with the main valve plug 20, the pilot valve plug member 68 is urged upwardly by means of a compression spring 72 arranged within the first bore 52.

The seating member 62 is formed with a plurality of radially extending ducts 74 which communicate with an annular chamber 76 defined in the second enlarged bore 60. This annular chamber 76 in turn communicates through at least one duct or passageway 78 with a vertically offset bore 80 defining an outlet chamber for the pilot valve mechanism 12. This outlet chamber 80 communicates through passageway 82 with the upper portion of the diaphragm chamber 44 above the main valve diaphragm 42.

Thus, when the pilot valve plug member 68 is opened (by moving downward against the biasing force of the compression spring 72) the relatively high pressure loading fluid flows from the chamber 52 below the plug member 68 upwardly through the central bore 64 in the seating member 62 through the radially extending ducts 74 to the annular chamber 76, and from there into the outlet chamber 80 to be applied against the main valve diaphragm 42. The pilot valve stem 66 includes a reduced diameter portion 84 in the region of the radial ducts 74 to facilitate this flow, and an enlarged section 86 thereabove which substantially corresponds to the diameter of the central bore 64 to substantially prevent the flow of fluid upwardly between the enlarged section 86 of the stem 66 and the bore 64 of the seating member 62. The upper end 88 of the valve stem 66 extends upwardly above the upper end surface of the seating member 62 when the pilot valve plug member 68 is in its closed position.

Above the seating member 62 and the pilot valve stem 66 there is provided a pressure responsive means 90 for controlling operation of the pilot valve 12 in order to regulate the supply of loading fluid to the main valve diaphragm 42 to provide a desired downstream pressure for the fluid exiting from the main valve 10. In the preferred embodiment, this pressure responsive means 90 comprises a pair of spaced pressure responsive elements, 92, 94 and still further preferably a pair of pressure responsive diaphragms. The lowermost diaphragm 94 is clamped at its outer periphery between the upper end of the casing cover member 46 and an intermediate spacer member 96 whereas the uppermost diaphragm 92 is clamped at its outer periphery between the spacer member 96 and an upper cap member 98. The centralmost portion of the lower diaphragm 94 is secured between a pair of central holding members 100, 102, one of which 102 is externally threaded and adapted to pass through an opening in the diaphragm 94, and the other of which 100 is arranged on the opposite side of the diaphragm 94 and internally threaded so that the lower diaphragm 94 is clamped between the end of member 100 and a shoulder provided on member 102.

The upper diaphragm 92 on the other hand is situated between the end of the central holding member 100 and a backup or supporting plate 104 arranged on the opposite side of the diaphragm 92. The holding member 100 and the supporting plate 104 are preferably secured together in a suitable manner. The upper cap member 98 is hollow and contains a compression spring 106 seated at its lower end on the backup or supporting plate 104 and at its upper against a guide button 108 engaged by adjustment screw 110 threaded in the top of the upper cap member 98. The adjustment screw 110 may be locked in an adjusted position by a lock nut 112 as is conventional. As is well known in the art, adjustment of the screw 110 controls the position of the guide button 108 which in turn controls the compression force exerted by the spring 106 on the lower backup or supporting plate 104. Further, it will be appreciated that because the lower holding member 102, the upper holding member 100 and the back up plate 104 are secured together, the pair of diaphragms 92, 94 will move together as a unit. Further, it should be noted that the spacing between the two diaphragms 92, 94 always remains constant.

The pair of pressure responsive diaphragms 92, 94 define between them a chamber 114 which is in fluid communication with the fluid downstream of the main valve 10 through passageway 116 in the spacer member 96 and a conduit 118 connected to coupling 48, the coupling 48 in turn being connected to the outlet conduit of the valve 10. The lowermost diaphragm 94 further defines a second chamber 120 above the second bore 60 provided in the cover member 46 above the seating member 62. This chamber 120 is in fluid communication with the pilot valve outlet 80 so that the relatively high pressure loading fluid is directed against the lowermost side of the lower diaphragm 94.

The uppermost diaphragm 92 has a larger effective area than the lower diaphragm 94 so that the downstream pressure applied between the two diaphragms 92, 94 creates an upward force for the pair of pressure responsive diaphragms 92, 94. Further, the relatively high pressure loading fluid sensed on the underside of the lower diaphragm 94 creates an additional upward force on the pair of diaphragms 92, 94. This net upward force is balanced by the adjusting spring 106 acting in the opposite direction on the upper side of the uppermost diaphragm 92.

The lower surface of the central holding member 102 is adapted to engage the upper end 88 of the valve stem 66 so that a net downward force on the pair of pressure responsive elements 92, 94 (as a result of the force exerted by the adjusting spring 106 being greater than the upward force caused by the downstream pressure and the loading pressure) moves the valve stem 66 downwardly and unseats the pilot valve plug member 68 to allow introduction of the relatively high pressure loading fluid into the pilot valve outlet bore 80 so that it is distributed to the upper surface of the main valve diaphragm 42 and to the undersurface of the lower diaphragm 94. On the other hand, if the upward force exceeds the downward force of the adjusting spring 106, the pair of pressure responsive elements 92, 94 will move upwardly, thereby resulting in the pilot valve plug member 68 being moved upwardly towards its closed position by the compression spring 72.

The lower central holding member 102 is not integrally connected to the valve stem 66 but rather is separable therefrom in order to open a bleed leakage path if the upward force on the pair of pressure responsive elements 92, 94 becomes too great. More particularly, the lowermost central holding member 102 is provided with a central bore 124 extending therethrough communicating with the inner bore 126 of the upper central holding member 100. The upper central holding member 100 is provided with a plurality of radially extending openings 128 through the side walls thereof so that the passageway 124 in the lower central holding member 102 is in fluid communication with the chamber 114 defined between the pair of pressure responsive elements 92, 94.

During normal operation when the lowermost central holding member 102 rests on the valve stem 66, the valve stem 66 serves to seal off or close this bleed leakage path (as shown in FIG. 1). That is, the end 88 of the valve stem 66 during normal operation is seated against the lower end surface of the central holding member 102 to close off the bleed leakage opening 124 therethrough. However, when there is a net upward force on the pair of pressure responsive elements 92, 94, the pair of pressure responsive elements 92, 94 will move upwardly against the force of the adjusting spring 106. Because the pilot valve plug member 68 is also biased upwardly by the compression spring 72, the plug member 68 moves with the pair of pressure responsive elements 92, 94 towards its valve seat 70. However, when the pilot valve plug member 68 seats against the valve seat 70, further upward movement of the plug member 68 is prevented so that if a net upward force still exists on the pair of pressure responsive elements 92, 94, the lowermost central holding member 102 will lift off the upper end 88 of the valve stem 66. This will thus open the bleed leakage opening 124 so that the relatively high pressure loading fluid in the pilot valve outlet bore 80 and in the chamber 120 below the pair of pressure responsive elements 92, 94 will flow through the bleed path 124, 126, 128 into the chamber 114 located between the pair of pressure responsive elements 92, 94. This will have the effect of reducing the loading pressure applied to the main valve diaphragm 42 (since additional loading fluid is not supplied by the closed pilot valve plug member 68) as the loading fluid is removed from the upper surface of the main valve diaphragm 42. This will serve to move the main valve plug 20 upwardly towards the valve seat 22.

Figure 2:
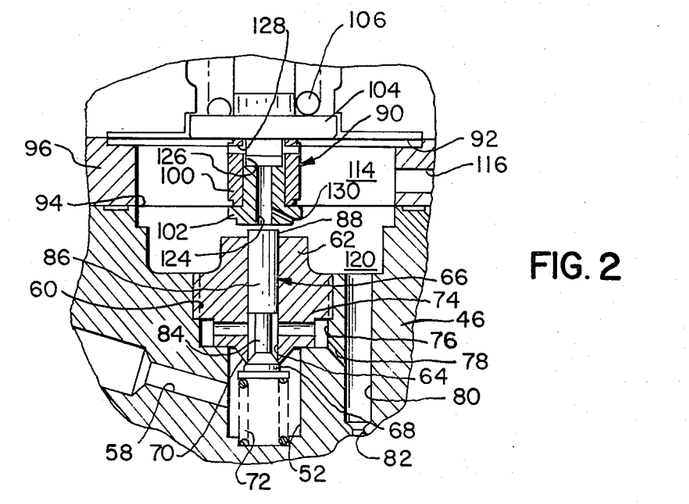
FIG. 2 is a enlarged sectional elevational view of a portion of the pilot mechanism illustrating the normally closed bleed leakage path in its opened position to direct loading fluid away from the main valve pressure responsive means.
Figure 3:
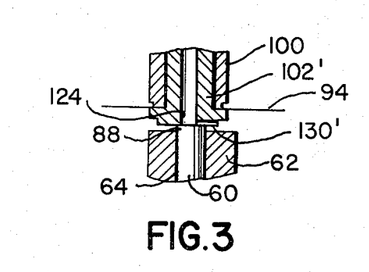
FIG. 3 shows an alternative arrangement for a portion of the pilot mechanism for providing a relatively small fixed bleed opening which is normally open.

In the preferred embodiment, there is also provided a second normally opened fixed bleed passageway 130 to provide for a bleed flow during normal operation when the central lowermost holding member 102 is seated against the pilot valve stem 66. This fixed bleed opening 130 preferably has a higher resistance to flow than the bleed passageway 124 which is normally closed by the pilot valve stem 66. For example, in the preferred embodiment, this additional fixed bleed opening 130 comprises a small orifice in the lower holding member 102 which is not closed by the valve stem 66 but always remains open (see FIGS. 1 and 2). Alternatively, such a fixed bleed opening 130 could be provided by providing a groove in one of the seating surfaces of the lower holding member 102 and the valve stem 66, such as for example the groove 130' in the holding member 102' shown in FIG. 3. Thus, by virtue of this small opening 130, there is a continuous flow, although very small, of the relatively high pressure loading fluid through the opening 130 to the chamber 114 between the pair of pressure responsive elements 92, 94. This is desirous in preventing any deadbands or ranges in which changes in downstream pressure might otherwise not effect changes in loading fluid supplied to the main valve diaphragm chamber 44. At the same time, however, the stability of the main valve plug 20 is not adversely affected since the fluid resistance of the path 130 is relatively high. Thus, the normally open bleed path 130 acts like an infinite resistance to small, high frequency oscillations in fluid dynamic forces. This in turn provides stiffness of response for the main valve plug 20.

In operation, the adjusting screw member 110 is screwed into the upper cap member 98 to depress the pair of pressure responsive elements 92, 94 through the spring 106, thereby forcing the central holding members 100, 102 downwardly to force the pilot valve stem 66 downwardly to open the pilot valve plug member 68 against the action of the coil spring 72. As a result, the fluid in the inlet conduit 54 for the pilot valve 42 passes upwardly through the opening 64 in the seating member 62 radially outward, into the pilot valve outlet bore 80 and from there to the top of the main valve diaphragm 42 as well as to the underside of the pair of pressure responsive elements 92, 94. By proper adjustment of the adjusting member 110, the amount of loading pressure supplied to the main valve diaphragm 42 can be controlled to provide for a relatively steady operation. That is, by virtue of the normally opened bleed leakage path 130, 126, 128, the loading pressure in the outlet bore 80 is continuously bled, at a relatively small rate, to the chamber 114 between the diaphragms 92, 94 which is in communication with the outlet pressure. During normal steady operation, the net upward force exerted on the pair of diaphragms 92, 94 by virtue of the downstream pressure acting between the pair of diaphragms 92, 94 and the loading pressure acting on the lowermost diaphragm 94 is balanced by the adjusting spring 106. Thus, the position of the pilot valve plug member 68 remains substantially constant, supplying a relatively constant amount of loading fluid to the main valve diaphragm 42 (and a corresponding amount of which is bled through the opening 130) to maintain the main valve plug 20 in proper position.

If the downstream pressure of the fluid exiting from the main valve 10 falls below the limit set by the adjusting spring 106, this lower pressure will be communicated between the pair of diaphragms 92, 94, thus reducing the net upward force against the adjusting spring 106. Because the force of the spring 106 will be greater than the upward force exerted by the downstream pressure and by the loading pressure acting on the lowermost diaphragm 94, the pair of diaphragms 92, 94 will be moved downwardly thereby opening the pilot valve plug member 68 to a greater extent to introduce more loading fluid into the pilot valve outlet 80 to thus increase the pressure of the loading fluid on the main valve diaphragm 42 to thereby open the main valve plug 20 to a greater extent to permit the passage of more fluid from the inlet 16 to the outlet 18 to increase the pressure on the outlet side. When the pressure on the outlet side reaches the desired limit, this pressure will be communicated between the pair of diaphragms 92, 94 to thus result again in a balanced condition, balancing the force applied by the adjusting spring 106.

On the other hand, an increase in the downstream pressure will cause the upward force on the pair of diaphragms 92, 94 to be greater than the force exerted on the adjusting spring 106 to thereby cause the diaphragms 92, 94 to more upwardly. As this occurs, the pilot valve plug member 68 will also move upwardly as a result of the pressure exerted by the spring 72 to move the plug member 68 towards the closed position. If the pressure increase in the downstream side of the main valve 10 is great enough, the diaphragms 92, 94 will more upwardly a distance sufficient to seat the plug member 68. When the plug member 68 is seated, if the upward force still exceeds that of the adjusting spring 106, the pair of diaphragms 92, 94 will continue to move upwardly to unseat the relatively large bleed opening 124 in the lower central holding member 102. This will cause the loading fluid to escape into the chamber 114 between the pair of diaphragms 92, 94, and more importantly, to reduce the pressure of the loading fluid on the main valve diaphragm 42 to close the main valve plug 20 to reduce the pressure of the outlet fluid. When the desired outlet pressure is again reached, the diaphragms 92, 94 will be seated against the pilot valve stem 66 to close the bleed opening 124 and to slightly open the pilot valve plug member 68.

It will be appreciated that the opening 124 of the relatively large bleed passageway in response to the downstream pressure being increased beyond a predetermined limit effects a quick bleeding of the loading fluid on the main valve diaphragm 42 to provide for a quicker response to changes in downstream pressure, as well as providing greater and faster correction capabilities for the pilot operated regulating valve 10, thereby resulting in less migration of the main valve plug 20. Without the provision of the relatively large bleed passageway 124 being opened in response to pressure increases beyond a predetermined limit, achievement of the desired pressure on the downstream side of the main valve 10 would be delayed until the loading pressure is leaked through the normally opened bleed passageway 130. Further in this regard, it should be noted that because the resistance to fluid flow through the normally opened fixed bleed passageway 130 is greater than the resistance to flow through the opening 124 in central holding member 102 when it is unseated, a much quicker reduction in the pressure of the loading fluid on the main valve diaphragm 42 will be achieved by opening and unseating the relatively large bleed opening 124 through the holding member 102.

It should also be noted that the arrangement in accordance with the preferred embodiment of double pressure responsive elements 92, 94 having different effective areas is advantageous in providing a fixed gain for the pilot operated pressure regulating valve 10 which is substantially independent of the pressure drop across the main valve 10. More particularly, as both the loading pressure acting on the lowermost diaphragm 94 as well as the downstream pressure acting on the difference between the effective areas of the upper and lower diaphragms 92, 94 serve to balance the force exerted by the adjusting spring 106, when changes in downstream pressure result in changes in loading pressure, this changed loading pressure is also applied to the diaphragm 94 to effect a change in the force exerted on the pair of diaphragms 92, 94 to oppose the force of the adjusting spring 106.

More specifically, as the gain or sensitivity of the pilot mechanism 12 is normally defined as the ratio of the change in loading pressure to the change in downstream pressure, it will be appreciated that in accordance with the preferred embodiment this ratio is equal to the ratio of the difference in areas to the area of the lower diaphragm 94. That is:

$$\frac{\Delta P_L}{\Delta P_D} = \frac{A_U - A_L}{A_L}$$

where
$P_L$ = loading pressure;
$P_D$ = downstream pressure;
$A_U$ = area of upper diaphragm 92; and
$A_L$ = area of lower diaphragm 94.

Thus, this ratio of pressure changes, because the areas are constant, is determined by design and is constant, regardless of the pressure drop. This is most advantageous in designing the pilot operated pressure regulating valve 10 so as to be acceptable and stable for both low pressure drop conditions and high pressure drop conditions.

Figure 4:
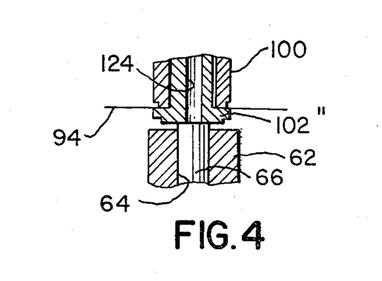
FIG. 4 shows a still further alternative arrangement of the pilot mechanism in which only a single, normally closed bleed path is provided for directing loading fluid away from the main pressure responsive element.

While in the preferred embodiment a small fixed bleed passage 130 is provided which results in the pilot valve plug member 68 always remaining open during normal operation, it should be noted that in some instances it may be desired that no fixed normally open bleed passageway be provided at all. In that instance, once a steady state operation is achieved, the pilot valve plug member 68 will be completely closed as the pressure of the loading fluid applied to the main valve diaphragm 42 will not substantially change (because there is no leakage). This is advantageous in providing stiffness of response for the main valve plug 20. FIG. 4 illustrates such an arrangement in which the lowermost diaphragm holding member 102" only has a normally closed bleed opening 124.

The operation of this alternative arrangement is substantially the same as for the preferred embodiment. If the downstream pressure decreases, the pair of pressure responsive elements 92, 94 will move downwardly to open the pilot valve plug member 68 to increase the pressure of the loading fluid on the main valve diaphragm 42 to in turn increase the pressure of the fluid in the downstream side of the main valve 10. On the other hand, increases in downstream pressure will cause the pair of pressure responsive elements 92, 94 to lift off the valve stem 66 to bleed the relatively high pressure loading fluid through the bleed opening 124. It should be noted that when the pilot valve plug member 68 is closed and the bleed passageway 124 is opened, as the pressure in the downstream side decreases, thereby causing the pressure responsive elements 92, 94 to move downwardly, there will be a small deadband or range at the instant that the lower holding element 102 seats against the valve stem 66. That is, as the downstream pressure continues to decrease, the pilot valve plug member 68 will not be opened immediately since the upward force exerted by the spring 72 must first be overcome before the plug member 68 unseats itself. In some instances, the deadband may be useful and desired in order to prevent undesired fluctuations or hunting of the pilot mechanism 12.

Accordingly, it is seen that in accordance with the present invention, there is provided a pilot mechanism 12 for a pressure regulating valve 10 which includes a relatively high pressure inlet 16, a relatively low pressure outlet 18 and main valve pressure responsive means 42 for operating the valve 10 to control the pressure of the fluid on the downstream side of the valve 10. The pilot mechanism 12 comprises pilot valve means 68 for supplying a loading fluid to one side of the main valve pressure responsive means 42. A normally closed bleed leakage path 124, 126, 128 is provided in communication with the loading fluid supplied to the main valve pressure responsive means 42 for directing loading fluid away from the main pressure responsive means 42 when the bleed path 124, 126, 128 is opened. Second pressure responsive means 90 are provided, which, in the preferred embodiment, comprise a pair of spaced pressure responsive elements 92, 94 having different effective areas. The second pressure responsive means 90 is responsive to the pressure to the fluid to be controlled for controlling the position of the pilot valve means 68 to in turn control the pressure of the loading fluid supplied to the main valve pressure responsive means 42. This second pressure responsive means 90 further includes bleed control means 66, 102 responsive to a predetermined increase in the pressure of the fluid to be controlled for opening the bleed leakage path 124, 126, 128 to rapidly reduce the pressure of the loading fluid operating on the main valve pressure responsive element 42.

While the preferred embodiments of the present invention have been shown and described, it will be understood that such are merely illustrative and that changes may be made without departing from the scope of the invention as claimed.

What is claimed is:

1. A pilot operated pressure regulating valve comprising:

a main valve casing having a valve inlet, a valve outlet, and a main valve seat and cooperating main valve plug member interposed between said valve inlet and said valve outlet, the position of said main valve plug member relative to said main valve seat controlling the flow of fluid from said valve inlet to said valve outlet;

main valve pressure responsive means operatively connected to said valve plug member for moving said main valve plug member to control the flow of fluid from said valve inlet to said valve outlet;

pilot valve means for controlling the supply of a loading fluid from a source of loading fluid at a predetermined pressure about the pressure of the fluid exiting from said main valve through said valve outlet to one side of said main valve pressure responsive means; and pilot valve pressure responsive means for controlling the position of said pilot valve means to control the flow of loading fluid supplied to said main valve pressure responsive means, said pilot valve pressure responsive means being responsive to the pressure of the fluid exiting through said valve outlet and to the pressure of the loading fluid supplied to said main valve pressure responsive means so that for a predetermined incremental change in pressure of the fluid exiting through said valve outlet, the position of said pilot valve means is changed to effect a predetermined fixed change in the pressure of said loading fluid supplied to said main valve pressure responsive means independent of said predetermined pressure of said loading fluid at said source of loading fluid.

2. The pilot operated pressure regulating valve of claim 1 wherein said normally closed bleed leakage path comprise a first bleed leakage path having a first resistance to fluid flow when said first bleed leakage path is opened, and wherein said pilot valve means further includes a second normally open bleed leakage path having a second resistance to fluid flow in communication with said loading fluid supplied to said main valve pressure responsive means for directing loading fluid away from said main valve pressure responsive means, said second resistance to fluid flow being greater than said first resistance to fluid flow so that when said first bleed leakage path is opened, a greater amount of loading fluid is directed away from said main valve pressure responsive means through said first bleed leakage path than through said second bleed leakage path.

3. A pilot mechanism for a pressure regulating valve having a relatively high pressure inlet, a relatively low pressure outlet, and main valve pressure responsive means for operating said pressure regulating valve to control the pressure of the fluid exiting from said pressure regulating valve through said low pressure outlet, said pilot mechanism comprising:

pilot valve means for controlling the supply of a loading fluid from a source of loading fluid at a predetermined pressure above the pressure of the fluid exiting from said pressure regulating valve through said low pressure outlet to one side of said main valve pressure responsive means; and pilot valve pressure responsive means for controlling the position of said pilot valve means to control the flow of loading fluid supplied to said main valve pressure responsive means, said pilot valve pressure responsive means being responsive to the pressure of the fluid exiting through said low pressure outlet and to the pressure of the loading fluid supplied to said main valve pressure responsive means so that for a predetermined incremental change in pressure of the fluid exiting through said low pressure outlet, the position of said pilot valve means is changed to effect a predetermined fixed change in the pressure of said loading fluid supplied to said main valve pressure responsive means independent of said predetermined pressure of said loading fluid at said source of loading fluid.

4. The pilot mechanism of claim 3, further including a normally closed bleed leakage path in communication with said loading fluid supplied to said main valve pressure responsive means for directing loading fluid away from said main valve pressure responsive means; and wherein said pilot valve pressure responsive means includes bleed control means responsive to a predetermined increase in the pressure of said fluid exiting through said low pressure outlet for opening said bleed leakage path to rapidly reduce the pressure of the loading fluid operating on said one side of said main valve pressure responsive means.

5. The pilot mechanism of claim 4 wherein said normally closed bleed leakage path comprises a first bleed leakage path having a first resistance to fluid flow when said first bleed leakage path is opened, and wherein said pilot mechanism further includes a second normally open bleed leakage path having a second resistance to fluid flow in communication with said loading fluid supplied to said main valve pressure responsive means for directing loading fluid away from said main valve pressure responsive means, said second resistance to fluid flow being greater than said first resistance to fluid flow so that when said first bleed leakage path is opened, a greater amount of loading fluid is directed away from said main valve pressure responsive means through said first bleed leakage path than through said second bleed leakage path.

6. The pilot mechanism of claim 5 wherein said first bleed leakage path includes a first opening of a first size, and wherein said second bleed leakage path includes a second opening of a second size smaller than said first size, and wherein said bleed control means includes closure means for normally closing said first opening and for opening said first opening in response to a predetermined increase in the pressure of the fluid to be controlled.

7. The pilot mechanism of claim 3 wherein said pilot valve pressure responsive means comprises: a pair of pressure responsive elements having different predetermined fixed effective areas, said pair of pressure responsive elements being separated from one another to define a fluid chamber therebetween, the pressure of said fluid exiting through said low pressure outlet being applied in said fluid chamber to said pair of pressure responsive elements and the pressure of said loading fluid supplied to said main valve pressure responsive means being applied outside of said fluid chamber to one of said pair of pressure responsive elements; and means applying a predetermined force outside of said fluid chamber to the other of said pair of pressure responsive elements, said pair of pressure responsive elements being operatively connected to said pilot valve means to change the position of said pilot valve means in response to changes in position of said pair of pressure responsive elements.

8. The pilot mechanism of claim 7 wherein said pilot valve means comprises a pilot valve housing defining a pilot valve inlet and a pilot valve outlet, a pilot valve seat interposed between said pilot valve inlet and said pilot valve outlet, and a pilot valve plug member movable relative to said pilot valve seat to control the supply of loading fluid from said pilot valve inlet to said pilot valve outlet, said pilot valve outlet being in fluid communication with said one side of said main valve pressure responsive means, and further including plug member control means operatively connecting said pair of pressure responsive elements with said pilot valve plug member for controlling the position of said pilot valve plug member relative to said pilot valve seat.

9. The pilot mechanism of claim 8 wherein said pilot valve pressure responsive means further includes first fluid communication means for providing fluid communication between said fluid chamber and said fluid exiting through said low pressure outlet and second fluid communication means for providing fluid communication between said loading fluid supplied to said main valve pressure responsive means and said one of said pair of pressure responsive elements.

10. The pilot mechanism of claim 9 wherein said one of said pressure responsive elements has a smaller predetermined fixed effective area than said other of said pressure responsive elements.

11. The pilot mechanism of claim 10 wherein said means for applying a force to said other of said pressure responsive elements comprises adjustable force means for adjustably varying the force applied on the side of said other pressure responsive element opposite from said fluid chamber.

12. The pilot mechanism of claim 11 wherein said plug member control means comprises a valve stem connected to said plug member and engagable with said pair of pressure responsive elements so that movement of said pair of pressure responsive elements causes movement of said plug member.

13. The pilot mechanism of claim 12 wherein said valve stem extends through said valve seat and is engagable with said one pressure responsive element, and further including bias means for biasing said plug member towards said pilot valve seat.

14. The pilot mechanism of claim 13 wherein said pair of pressure responsive elements and said valve stem are separable from one another so that when the pressure of the fluid exiting through the low pressure outlet increases beyond a predetermined limit and said plug member is seated against said valve seat, said pair of pressure responsive elements move in a direction away from said valve stem.

15. The pilot mechanism of claim 14 wherein said pair of pressure responsive elements include a holding member engagable by said valve stem, and further including a bleed leakage passageway through said holding member providing communication between said loading fluid supplied to said main valve pressure responsive means and said fluid chamber between said pair of pressure responsive elements for directing loading fluid away from said main valve pressure responsive means into said fluid chamber, said passageway in said holding member being closed by said valve stem when said holding member and said valve stem are in contact with one another and being opened when said holding member and valve stem are separated.

16. The pilot mechanism of claim 15 further including a second normally opened bleed leakage path in communication with said loading fluid supplied to said main valve pressure responsive means for directing loading fluid away from said main valve pressure responsive means, said normally opened bleed leakage path having a higher resistance to flow than said passageway in said holding member when said passageway in said holding member is opened.

17. The pilot mechanism of claim 16 wherein said passageway in said holding member comprises a first passageway and wherein said normally opened bleed leakage path comprises a second passageway in said holding member spaced from said first passageway and said valve stem when said valve stem and said holding member are in contact with one another.

18. The pilot mechanism of claim 16 wherein said normally opened bleed leakage path comprises a groove in the seating surface of said holding member to allow loading fluid to pass through said groove into said passageway in said holding member.

19. The pilot mechanism of claim 15 wherein said passageway through said holding member comprises the only bleed leakage path for directing loading fluid away from said main valve pressure responsive means.

20. The pilot operated pressure regulating valve of claim 1 further including a normally closed bleed leakage path in communication with said loading fluid supplied to said main valve pressure responsive means for directing loading fluid away from said main valve pressure responsive means; and wherein said pilot valve pressure responsive means includes bleed control means responsive to a predetermined increase in the pressure of said fluid exiting through said low pressure outlet for opening said bleed leakage path to rapidly reduce the pressure of the loading fluid operating on said one side of said main valve pressure responsive means.

21. The pilot operated pressure regulating valve of claim 1 wherein said pilot valve pressure responsive means comprises: a pair of pressure responsive elements having different predetermined fixed effective areas, said pair of pressure responsive elements being separated from one another to define a fluid chamber therebetween, the pressure of said fluid exiting through said low pressure outlet being applied in said fluid chamber to said pair of pressure responsive elements and the pressure of said loading fluid supplied to said main valve pressure responsive means being applied outside of said fluid chamber to one of said pair of pressure responsive elements; and means applying a predetermined force outside of said fluid chamber to the other of said pair of pressure responsive elements, said pair of pressure responsive elements being operatively connected to said pilot valve means to change the position of said pilot valve means in response to changes in position of said pair of pressure responsive elements.

22. The pilot operated pressure regulating valve of claim 21 further including first communication means for providing fluid communication between said fluid chamber and said fluid exiting through said valve outlet, and second communication means providing communication between said loading fluid supplied to said main valve pressure responsive means and the outside of said one of said pressure responsive elements.

23. The pilot operated pressure regulating valve of claim 22 wherein said one of said pressure responsive elements has a smaller predetermined fixed effective area than said other of said pressure responsive elements.

24. The pilot operated regulating valve of claim 22 wherein said means for applying a force to said other of said pressure responsive elements comprises adjustable force means for adjustably varying the force applied on the side of said other pressure responsive element opposite from said fluid chamber.

25. The pilot operated pressure regulating valve of claim 24 wherein said pilot valve means includes a valve stem engagable with said one of said pair of pressure responsive elements so that movement of said pair of pressure responsive elements will cause movement of said pilot valve means, said pair of pressure responsive elements and said pilot valve stem being separable from one another so that when the pressure of the fluid exiting through said valve outlet increases beyond a predetermined limit and said pilot valve means is closed, said pair of pressure responsive elements move in a direction away from said valve stem.

26. The pilot operated regulating valve of claim 25 wherein said pair of pressure responsive elements include a holding member engagable by said valve stem, and further including a bleed leakage passageway through said holding member providing communication between said loading fluid supplied to said main valve pressure responsive means and said fluid chamber between said pair of pressure responsive elements for directing loading fluid away from said main valve pressure responsive means into said fluid chamber, said passageway in said holding member being closed by said valve stem when said holding member and said valve stem are in contact with one another and being opened when said holding member and valve stem are separated.

* * * * *